United States Patent [19]

Nielson et al.

[11] Patent Number: 5,329,574
[45] Date of Patent: Jul. 12, 1994

[54] METHOD FOR IMPROVING TELEPHONE RESOURCE ACCESS IN A COMMUNICATION SYSTEM NETWORK

[75] Inventors: Mark R. Nielson, Elgin; Daniel J. McDonald, Cary, both of Ill.

[73] Assignee: Motorola, Inc., Schaumburg, Ill.

[21] Appl. No.: 841,966

[22] Filed: Feb. 26, 1992

[51] Int. Cl.$^5$ .................... H04M 11/00; G05B 23/02; H04Q 7/00

[52] U.S. Cl. ................. 379/58; 340/825.06; 379/59; 455/33.1; 455/34.1

[58] Field of Search ................. 370/58.1, 62, 61, 85.8, 370/95.2, 110.1; 379/56, 58; 455/54.1

[56] References Cited

U.S. PATENT DOCUMENTS

| | | | |
|---|---|---|---|
| 4,945,355 | 7/1990 | Blanchette | 340/825.06 |
| 5,086,507 | 2/1992 | Mela | 455/34 |
| 5,093,926 | 3/1992 | Sasuta | 455/34 |
| 5,125,103 | 6/1992 | Grube et al. | 455/33.1 |
| 5,127,042 | 6/1992 | Gillig et al. | 379/59 |
| 5,157,709 | 10/1992 | Ohteru | 379/58 |
| 5,168,575 | 12/1992 | Cizek et al. | 455/33.1 |

Primary Examiner—Curtis Kuntz
Assistant Examiner—William Cumming
Attorney, Agent, or Firm—Timothy W. Markison

[57] ABSTRACT

In a communication system network, a communication unit may maintain allocation of a telephone resource when it roams into another communication system. Having established a communication in a first communication system, the communication unit is allocated a communication resource in the first communication system and is also allocated a telephone resource. While the communication unit is allocated the communication resource and the telephone resource, it determines whether the transceiving quality of the allocated communication resource has degraded below a predetermined level. When the transceiving quality has degraded below a predetermined level, the communication unit transmits a registration packet to second communication system via the central controller. Upon receiving the registration packet, the central controller reclaims the allocated communication resource in the first communication unit and attempts to allocate a communication resource in the second communication system. When the second communication system does not have an available communication resource, the central controller maintains the allocation of the telephone resource to the communication unit until a communication resource becomes available in the second communication system.

13 Claims, 2 Drawing Sheets

METHOD FOR IMPROVING TELEPHONE RESOURCE ACCESS IN A COMMUNICATION SYSTEM NETWORK

FIELD OF THE INVENTION

This invention relates generally to communication system networks and in particular to a method that allows a communication unit that is presently accessing a telephone resource to maintain the allocation of that telephone resource when the communication unit roams into a new communication system.

BACKGROUND OF THE INVENTION

Communication system networks are known to comprise a plurality of communication systems and a central controller. Each of the communication systems comprises a plurality of communication units, a limited number of communication resources that are transceived via a limited number of repeaters, and a communication resource allocator that allocates the communication resources among the plurality of communication units. The communication units, which may be mobile radios, portable radios, and/or portable radio/telephones, are typically arranged in to communication groups and are generally located throughout the communication system network. Of the communication resources, which may be TDM slot locations, frequency carriers, pair of frequency carriers, or any other RF transmission means, one is selected to function as a control channel. The control channel transceives operational information between the communication units and the central controller via the communication resource allocators.

As is known, a communication unit may establish a communication with other communication units within the communication system network by transmitting an inbound signalling word (ISW) to the central controller via the communication resource allocator of the communication system that the communication unit is located in. Upon receiving the request, the central controller processes it and, if the request is valid, the central controller allocates a communication resource in each of the communication systems that have a communication unit of the targeted talk group in it. The communication systems, which may also be communication sites, are coupled to and controlled by the central controller. If a communication system, or site, loses contact with the central controller, the communication system, or site, operates as an independent communication system but only for communication units that are located within its coverage area.

As is also known, a communication system network may interface with a telephone system such that communication units within the network can access telephone lines. These telephone resources are allocated by the central controller to a communication unit in a similar manner as the communication resources are allocated. When a communication unit has access to a telephone resource and a communication resource in the communication system that it is located in, it may communicate to a land-line user. A difficulty arises when the communication unit roams from one communication system to another. Under such conditions, the communication unit loses the communication resource of the system that it was in and, subsequently, the central controller would reclaim the telephone resource even if the communication unit was not finished with its communication. This obviously presents a problem to the user of the communication unit while he is communicating via a telephone resource. Therefore, a need exists for a method that will allow a communication unit to maintain allocation of a telephone resource when it roams into another communication system.

SUMMARY OF THE INVENTION

These needs and others are substantially met by the method for improving telephone resource access in a communication system network disclosed herein. In a network of communication systems that comprises a plurality of communication systems, a central controller that interfaces with the plurality of communication systems, and a limited number of telephone resources, wherein each communication system includes a plurality of communication units that are arranged into communication groups, a limited number of communication resources that are transceived via a limited number of repeaters, and a communication resource allocator that allocates the limited number of communication resources among the plurality of communication units, the following discloses a method that allows a communication unit to maintain allocation of a telephone resource when it roams into another communication system.

The process begins when a communication unit located in a first communication system establishes a communication in that communication system such that the communication unit has been allocated a communication resource in the first communication system and a telephone resource. Having been allocated the telephone resource and the communication resource, the communication unit determines whether the transceiving quality of the allocated communication resource in the first communication unit has degraded below a predetermined level. If the transceiving quality is below the predetermined level, the communication unit transmits a registration packet to a second communication system via the central controller.

Once the central controller receives the registration packet to a second communication system, it reclaims the allocated communication resource in the first communication system and maintains allocation of the telephone resource to the communication unit. Subsequently, the central controller determines whether the second communication system has an available communication resource. When the second communication system does not have an available communication resource, the central controller maintains the allocation of the telephone resource to the communication unit until a communication resource becomes available in the second communication system.

DESCRIPTION OF A PREFERRED EMBODIMENT

Figure 1:
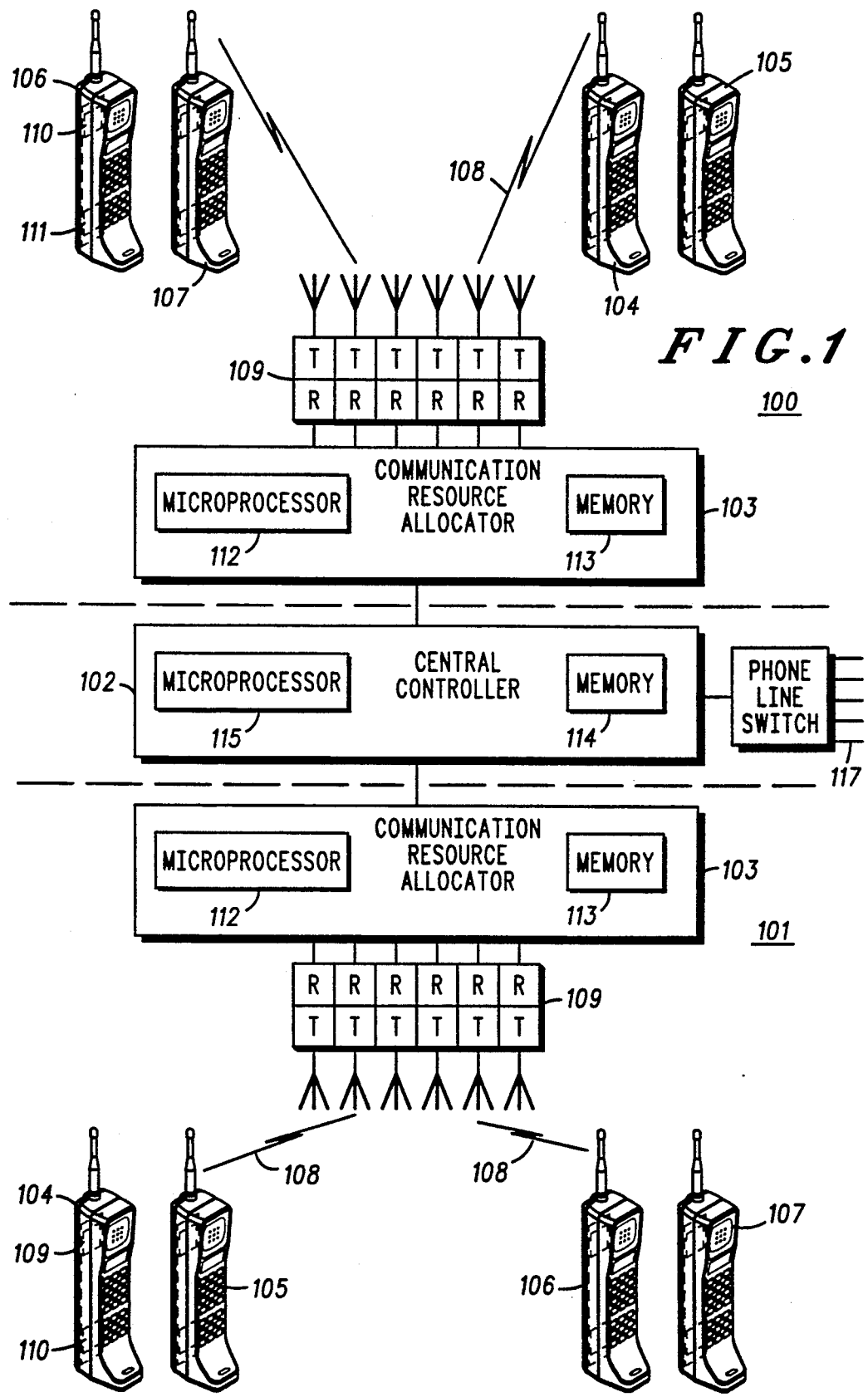
FIG. 1 illustrates a communication system network that may incorporate the present invention.

FIG. 1 illustrates a trunked communication system network that comprises a plurality of communication systems 100, 101 (only two shown), a central controller 102, a phone line switch 116, and a limited number of telephone lines 117. Each of the communication systems, which may also be communication sites, comprises a communication resource allocator 103, a limited number of communication resources 108, a number of repeaters, or base stations, 109, and a plurality of communication units 104–107. The central controller 102, which may be a Motorola Smart Zone controller, comprises a microprocessor 112, which may be a Motorola 68040 microprocessor, and digital memory 113, which may be RAM, ROM, or any other type of means for storing digital information. Each communication resource allocator 103, which may be a Motorola remote central site controller, comprises a microprocessor 112, which may be a Motorola 6809 microprocessor, and digital memory 113, which may be RAM, ROM, or any type of means for storing digital information. Each of the communication units 104–107, which may be a Motorola STX, comprises a microprocessor 110, which may be a Motorola 68HC11 microprocessor, and digital memory 111, which may be RAM, ROM, or any other type of means for storing digital information. The communication resources 108 are transceived between the communication units 104–107 and the communication resource allocator 103 via the repeaters 109, and wherein one of the communication resources is selected as a control channel.

Generally, the present invention provides a method that allows a communication unit that is involved in a telephone call to maintain access of a telephone resource when it roams from one communication system to another. The communication unit initiates the procedure when, after monitoring the quality of the transmission of the allocated communication resource in the communication system that the unit is presently registered in, falls below a predetermined level. (The predetermined level of transceiving quality is known to be the level at which the communication units cannot accurately receive information on the allocated communication resource.)

When the transceiving quality falls below the predetermined level, the communication unit is deregister from that system and attempts to register with another communication system that has an acceptable transmission quality on its control channel. Once the communication unit is registered with the new communication system, the central controller automatically attempts to allocate it a communication resource. If the new communication system does not have a communication resource available, the central controller retains allocation of a telephone resource to the communication unit until a communication resource becomes available in the new communication system.

Figure 2:
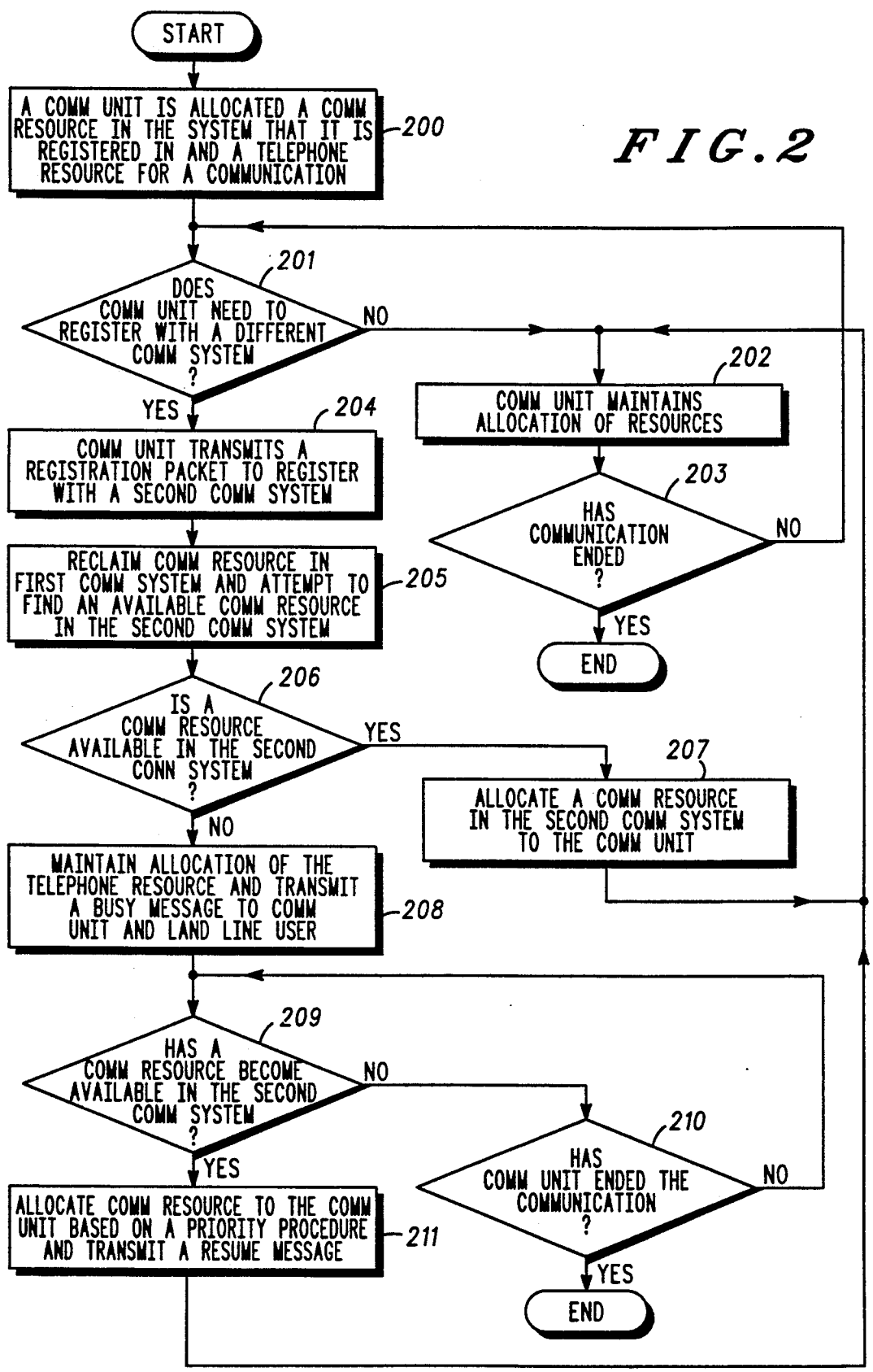
FIG. 2 illustrates a logic diagram that may be used to implement the present invention.

The present invention can be more fully described with reference to FIG. 2. At step 200, a communication unit is allocated a communication resource in a first communication system and is also allocated a telephone resource to establish a communication. As is known, a communication unit in a trunked communication system network may place and receive telephone communications wherein the central controller is operably coupled to a phone line switch. The inner operation between the central controller and the phone line switch is known thus no further discussion will be presented. Having been allocated a communication resource in the first communication system, the communication unit monitors the transceiving quality of the allocated communication resource to determine whether it has degraded below a predetermined level 201. When the transceiving quality falls below the predetermined level, the communication unit must attempt to register with a new communication system 201.

If the transceiving quality has not dropped below the predetermined level, the communication unit maintains allocation of both the communication resource and the telephone resource 202. While the communication unit has allocation of these resources, the central controller monitors to determine whether the communication has ended 203. If the call has ended, the resources are reclaimed by the central controller such that they may be allocated to different communication units. If the call has not ended, the process repeats at step 201 and either waits for the call to end or for the communication unit to attempt to register with a different communication system.

If the communication unit determines that it needs to register with a different communication system 201, the communication unit transmits a registration packet to the central controller 204 such that it may register with a second communication system. The contents of the registration packet are known to comprise the communication units identification code and other identifying information, because registration packets are known in the art no further discussion will be presented. Additionally, determining which communication system to register with is known, thus no further discussion will be presented. Upon receiving the registration packet, the central controller reclaims the communication resource in the first communication system and attempts to find an available communication resource in the second communication system 205. If a communication resource is available in the second communication system 206, the central controller allocates the communication resource to the communication unit 207 and the process proceeds at step 202.

If a communication resource is not available in the second communication system 206, the central controller maintains allocation of the telephone resource for the communication unit and transmits a busy message to the communication unit and on the telephone resource 208. The busy message indicates that the call is still active but presently there is not a communication resource available to complete the call. Having transmitted the busy signal, the central controller determines whether a communication resource becomes available in the second communication system 209. When a resource is not available, the central controller determines whether the communication unit has ended the communication 210. If the communication unit has ended the communication, the process ends for that particular communication and the central controller reclaims the telephone communication resource. If the communication unit has not ended the communication 210, the central controller waits either for a communication resource to become available in the second communication system or the communication unit to end the communication.

When a communication resource becomes available in the second communication system, the central controller allocates the available communication resource to the communication unit based on a priority procedure and transmits it a resumed communication message to the communication unit and on the telephone resource 211. The resume communication message is a message to indicate to both the communication unit and the land line user of the telephone resource that the call is resuming. The priority procedure of allocating a communication resource is based on known priority schemes, i.e. for emergencies, priority users, and is expanded to include communication units that have a telephone resource allocated to it. Once the communication resource has transmitted the resumed communication and allocated the communication resource to the communication unit, the process proceeds at step 202.

By incorporating the present invention into a trunked communication system network, the central controller can more efficiently respond to telephone communications. Thus the subscriber of a communication unit is less likely to lose a telephone communication when it roams from communication system to communication system.

We claim:

1. In a network of communication systems that comprises a plurality of communication systems, a central controller that interfaces with the plurality of communication systems and a limited number of telephone resources, wherein each communication system includes a plurality of communication units that are arranged into communication groups, a limited number of communication resources that are transceived via a limited number of repeaters, and a communication resource allocator that allocates via the central controller the limited number of communication resources among the plurality of communication units, a method that allows a communication unit that is accessing a telephone resource to maintain the telephone resource when the communication unit roams in to a communication system that presently has no available communication resources, the method comprises the steps of:
   a) establishing a communication with a communication unit in a first communication system, wherein the communication unit is allocated a communication resource in the first communication system and is allocated a telephone resource;
   b) determining, by the communication unit, whether transceiving quality of the allocated communication resource in the first communication system has degraded below a predetermined level;
   c) when the transceiving quality is below the predetermined level, trasmitting a registration packet to a second communication system via the central controller;
   d) reclaiming, by the central controller, the allocated communication resource in the first communication system;
   e) when the central controller determines that the second communication system presently does not have an available communication resource, maintaining the allocation of the telephone resource to the communication unit until a communication resource becomes available in the second communication system.

2. The method of claim 1 further comprises transmitting, by the central controller, a busy message to the communication unit.

3. The method of claim 2 further comprises transmitting, by the central controller, a busy message on the allocated telephone resource.

4. The method of claim 1 further comprises allocating a communication resource in the second communication system to the communication unit based on a priority procedure when a communication resource becomes available in the second communication system.

5. In the method of claim 4, the predetermined allocation procedure comprises allocating the communication resource to the communication unit, wherein the communication unit has been assigned as a priority communication unit.

6. The method of claim 4 further comprises transmitting, by the central controller, a resume communication message to the communication unit.

7. The method of claim 6 further comprises transmitting, by the central controller, a resume communication message on the allocated telephone resource.

8. The method of claim 1 further comprises terminating the communication by the communication unit before a communication resource becomes available in the second communication system.

9. In a network of communication systems that comprises a plurality of communication systems, a central controller that interfaces with the plurality of communication systems and a limited number of telephone resources, wherein each communication system includes a plurality of communication units that are arranged into communication groups, a limited number of communication resources that are transceived via a limited number of repeaters, and a communication resource allocator that allocates via the central controller the limited number of communication resources among the plurality of communication units, a method that allows a communication unit to maintain allocation of a telephone resource when the communication unit roams in to a communication system that presently has no available communication resources, the method comprises the steps of:
   a) engaging in a communication in a first communication system, wherein a communication resource in the first communication system and a telephone resource are allocated to the communication unit;
   b) determining whether transceiving quality of the allocated communication resource in the first communication system has degraded below a predetermined level;
   c) when the transceiving quality is below the predetermined level, transmitting a registration packet to a second communication system via the central controller;
   d) reclaiming, by the central controller, the allocated communication resource in the first communication system;
   c) when the central controller determines that the second communication system does not have an available communication resource, maintaining the allocation of the telephone resource to the communication unit until a communication resource becomes available in the second communication system;
   f) when a communication resource is not available in the second communication system, periodically receiving a busy message, wherein the busy message indicates that the communication is maintained but temporarily inactive.

10. The method of claim 9 further comprises terminating the communication by the communication unit before a communication resource becomes available in the second communication system.

11. The method of claim 9 further comprises setting a predetermined time interval when the busy message is received.

12. The method of claim 11 further comprises terminate the communication when the predetermined time interval expires.

13. The method of claim 9 further comprises resuming the communication when a communication resource in the second communication system has been allocated.

* * * * *